United States Patent
Poteet et al.

(10) Patent No.: US 11,221,039 B2
(45) Date of Patent: Jan. 11, 2022

(54) BEARING ASSEMBLY WITH SURFACE LAYER

(71) Applicant: Hamilton Sundstrand Corporation, Windsor Locks, CT (US)

(72) Inventors: Steven Poteet, Hamden, CT (US); David J. Grulke, Tolland, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 407 days.

(21) Appl. No.: 15/401,878

(22) Filed: Jan. 9, 2017

(65) Prior Publication Data
US 2018/0195551 A1    Jul. 12, 2018

(51) Int. Cl.
*C07F 7/02*       (2006.01)
*F16C 33/12*     (2006.01)
(Continued)

(52) U.S. Cl.
CPC ......... *F16C 17/102* (2013.01); *C10M 107/44* (2013.01); *C10M 125/02* (2013.01); *C10M 125/22* (2013.01); *C10M 125/26* (2013.01); *F16C 17/024* (2013.01); *F16C 32/0633* (2013.01); *F16C 33/107* (2013.01); *F16C 33/1095* (2013.01); *C10M 2201/041* (2013.01); *C10M 2201/0413* (2013.01); *C10M 2201/066* (2013.01); *C10M 2201/0613* (2013.01); *C10M 2201/0623* (2013.01); *C10M 2201/087* (2013.01); *C10M 2217/0443* (2013.01); *C10N 2020/06* (2013.01); *C10N 2040/02* (2013.01); *C10N 2050/08* (2013.01); *F16C 2240/48* (2013.01)

(58) Field of Classification Search
USPC ........................................................ 508/103
See application file for complete search history.

(56) References Cited

U.S. PATENT DOCUMENTS

| 5,384,352 A | 1/1995 | Andres et al. |
| 7,147,376 B2 | 12/2006 | Shimizu et al. |
| (Continued) | | |

FOREIGN PATENT DOCUMENTS

| DE | 19621773 A1 | 12/1996 |
| DE | 10062106 B4 | 1/2011 |
| (Continued) | | |

OTHER PUBLICATIONS

European Search Report; Search report EP 18150611; dated Apr. 30, 2018, p. 3.
(Continued)

*Primary Examiner* — Prem C Singh
*Assistant Examiner* — Francis C Campanell
(74) *Attorney, Agent, or Firm* — Cantor Colburn LLP

(57) ABSTRACT

A bearing assembly is disclosed that includes a first component with a first bearing surface, and a second component with a second bearing surface. A fluid is disposed between the first bearing surface and the second bearing surface supporting the first bearing surface and the second bearing surface in a non-contact rotational relationship. The first bearing surface, or the second bearing surface, or both the first bearing surface and the second bearing surface include a surface layer with solid lubricant 2D nanoparticles in a matrix.

16 Claims, 3 Drawing Sheets

(51) Int. Cl.
*F16C 33/04* (2006.01)
*F16C 17/10* (2006.01)
*F16C 33/10* (2006.01)
*C10M 107/44* (2006.01)
*C10M 125/02* (2006.01)
*C10M 125/26* (2006.01)
*C10M 125/22* (2006.01)
*F16C 32/06* (2006.01)
*F16C 17/02* (2006.01)
*C10N 20/06* (2006.01)
*C10N 40/02* (2006.01)
*C10N 50/08* (2006.01)

(56) References Cited

U.S. PATENT DOCUMENTS

| | | | |
|---|---|---|---|
| 7,535,150 B1* | 5/2009 | Wilson | F04D 29/056 310/166 |
| 2005/0009712 A1 | 1/2005 | Erdemir | |
| 2007/0249506 A1 | 10/2007 | Mack et al. | |
| 2011/0046027 A1 | 2/2011 | Zhamu et al. | |
| 2012/0201487 A1* | 8/2012 | Kverel | C10M 103/00 384/463 |
| 2013/0136684 A1 | 5/2013 | Wu et al. | |
| 2017/0058943 A1* | 3/2017 | Tanaka | F16C 9/02 |
| 2017/0167293 A1* | 6/2017 | McAuliffe | F16C 37/00 |

FOREIGN PATENT DOCUMENTS

| | | |
|---|---|---|
| EP | 0303189 A2 | 2/1989 |
| EP | 2799755 A2 | 11/2007 |
| GB | 2528306 A | 1/2016 |
| JP | 2007255651 A | 10/2007 |
| KR | 20090043161 A | 5/2009 |
| WO | 2012127998 A1 | 9/2012 |
| WO | 2015041612 A1 | 3/2015 |
| WO | 2015157052 A1 | 10/2015 |

OTHER PUBLICATIONS

Search Report dated Apr. 30, 2018.
European Search Report for European Application No. 18150611.4 dated May 24, 2019; 54 Pages.
Hod; "Graphite and Hexagonal Boron-Nitride Possess the Same Interlayer Distance. Why?"; Journal of Chemical Theory and Computation; 2012; 8; 4, pp. 1360-1369, retrieved from https://arxiv.org/ftp/arxiv/papers/1109/1109.3813.pdf.
Li et al.; "Two-Dimensional MoS2: Properties, Preparation, and Applications"; Journal of Materiomics; vol. 1; 2015; pp. 33-44.
Ni et al.; "Graphene Thickness Determination Using Reflection and Contrast Spectroscopy"; Nano Letters; vol. 7, No. 9; 2007; pp. 2758-2763.

\* cited by examiner

BEARING ASSEMBLY WITH SURFACE LAYER

BACKGROUND

Bearing assemblies are widely used to provide engagement between a moving component or assembly (i.e., a rotor) and a support or other structure that is stationary or that moves at a different speed than the moving component or assembly. One challenge faced by bearing assemblies is management of friction between the moving and non-moving components or between components moving at different speeds. Many bearing assemblies utilize one or more rolling surfaces such as balls or other rollers disposed in a raceway formed by race structures integrated with or attached to the rotor and the support. Other bearing assemblies rely on low-friction sliding surfaces for engagement between the rotor and support. Another type of bearing assembly relies on the presence of a fluid between the bearing surfaces to maintain the bearing surfaces in a non-contact relationship. The fluid can be a liquid or a gas, with the gas often provided under pressure sufficient to maintain the bearing surfaces in a non-contact relationship. In many cases, the fluid between the bearing surfaces is pressurized air, and such bearings are commonly referred to as "air bearings".

Non-contact bearing assemblies such as air bearings can provide effective management of significant frictional forces to the bearing surfaces. However, friction on the bearing surfaces is not necessarily eliminated for all operational conditions. For example, in the case of pressurized air supplied to an aerostatic or hydrostatic bearing, any interruption of the pressurized fluid source can subject the bearing surfaces to frictional contact. Also, non-standard operating conditions such as an overload on the bearing assembly can overwhelm the fluid buffer and force the components into frictional contact. In the case of aerodynamic or hydrodynamic bearings that rely on the motion of the bearing components themselves or on connected components to generate or pressurize the fluid buffer, the bearing surfaces can come into frictional contact during commencement or termination of the components' motion (i.e., startup or shutdown).

BRIEF DESCRIPTION

In some embodiments of this disclosure, a bearing assembly comprises a first component comprising a first bearing surface, and a second component comprising a second bearing surface. A fluid is disposed between the first bearing surface and the second bearing surface supporting the first bearing surface and the second bearing surface in a non-contact rotational relationship. The first bearing surface, or the second bearing surface, or both the first bearing surface and the second bearing surface include a surface layer comprising solid lubricant 2D nanoparticles in a matrix.

In some embodiments, a bearing comprises a support, a bump foil over the support, a top foil over the bump foil, and a surface layer over the bump foil comprising solid lubricant 2D nanoparticles in a matrix.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
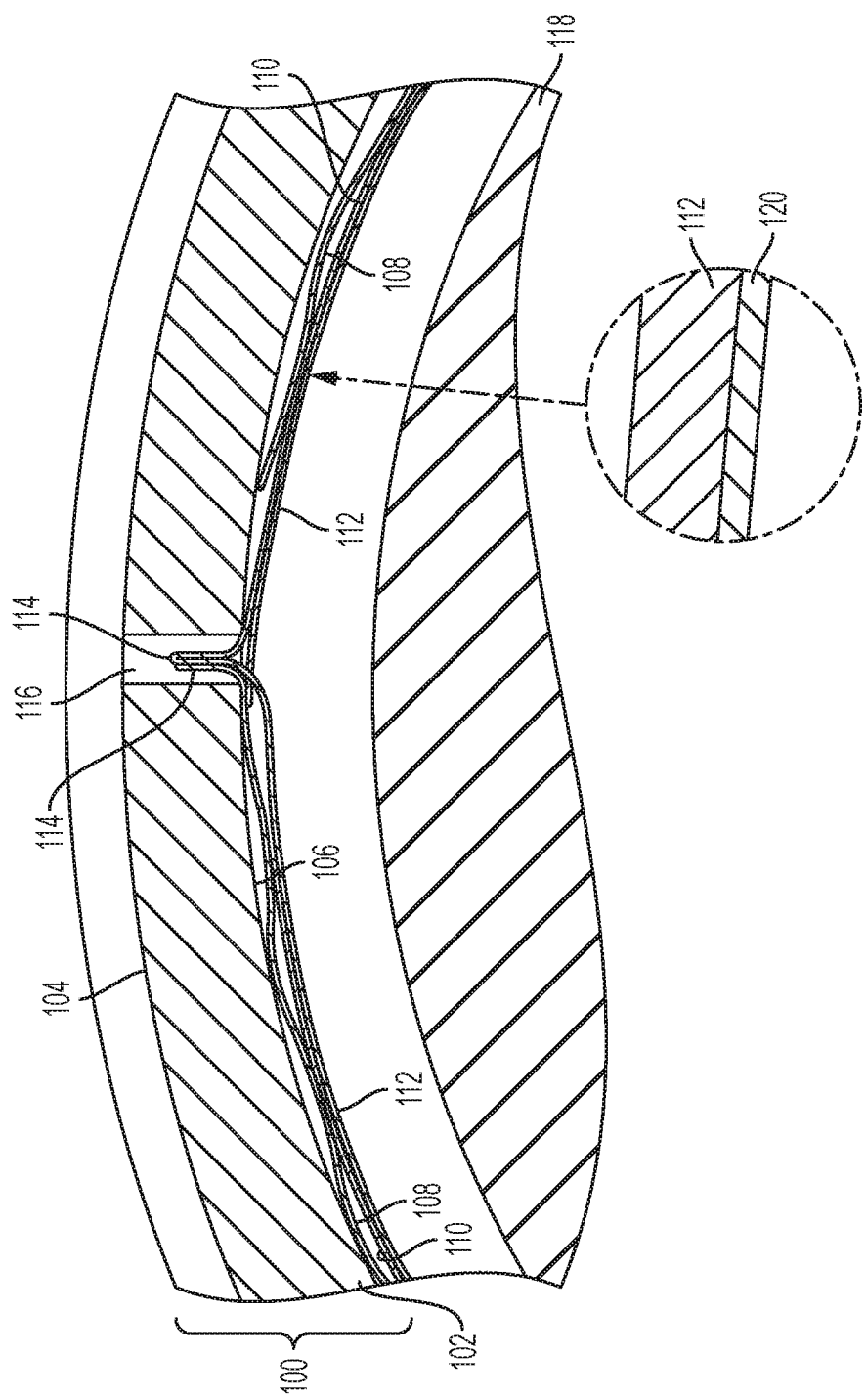
FIG. 1 is a partial cross-sectional view of an example embodiment of a journal bearing.

With reference now to the Figures, FIG. 1 is a cross-sectional view of an example embodiment of a fluid film journal bearing assembly (journal bearing 100). The journal bearing 100 includes a journal sleeve 102 that defines an outer diameter surface 104 and an inner diameter surface 106. The journal sleeve 102 is substantially cylindrical and is arranged about a central axis. It should be noted that the journal sleeve can have a conventional cylindrical shape, or can be shaped with a weight-reduced profile, or configured as other shapes or configurations, and FIG. 1 merely presents an exemplary configuration of a journal bearing 100.

In FIG. 1, a number of foils are arranged inside the journal sleeve 102. The journal bearing 100 includes a bump foil 108, an intermediate foil 110, and a top foil 122. The bump foil 108, the intermediate foil 110, and the top foil 112 are each formed from thin sheets of material (e.g., nickel-based alloys, steel, or similar materials) wrapped in a generally cylindrical shape and positioned in a bore of the journal sleeve 102. The bump foil 108 is corrugated, allowing a working fluid and/or cooling fluid to flow through the spaces formed between adjacent corrugations. The bump foil 108 is positioned adjacent to the inner diameter surface 106 of the journal sleeve 102. The foils 108, 110, and 112 are retained relative to the journal sleeve 102 with bent portions 114 that engage a key slot 116. A rotating component 118, such as a shaft can be positioned inside the journal bearing 100, radially inward from the top foil 112. The rotating component 118 is typically in close proximity to the top foil 112, but for ease of illustration is shown in a partial exploded view with an exaggerated distance between the top foil 112 and the rotating component 118. During operation, moving air generated by action of the rotating component 118 urges pressurized air radially outward against the compliant foil structure 108, 110, and 112 to create a fluid air layer separating the rotating component 118 and the journal bearing 100.

As further shown in FIG. 1, a surface layer 120, which is exposed to a bearing surface of a rotating component, is disposed over (in this case, radially inward from) the top foil 112. The surface layer 120 comprises solid lubricant 2D nanoparticles in a matrix. In some embodiments, the surface layer can have a thickness in a range with a low end of 2 nm, 8, nm, or 12 nm, and a high end of 65 nm, 40 nm, or 20 nm. All possible combinations of the above-mentioned range endpoints (excluding impossible combinations where a low endpoint would have a greater value than a high endpoint) are explicitly included herein as disclosed ranges. The surface layers discussed herein can be included as a surface layer on either or both of the bearing surfaces of relative motion. For example, in the case of the example embodiment such as FIG. 1 showing a bearing assembly comprising a rotating member 118 and a journal bearing 100, the surface layer can be on the surface of the bearing surface on the radially inner surface of top foil 112 as shown for surface layer 120 in FIG. 1, or the surface layer can be on the radially outer surface of the rotating member 118, or the surface layer can be on the surface of the bearing surface on the radially inner surface of top foil 112 as shown for surface layer 120 in FIG. 1 and on the radially outer surface of the rotating member 118.

The matrix of a surface layer such as surface layer 120 can include any sort of matrix material, including but not limited to polymers, ceramics, metal, or matrix materials that can form a continuous phase. In some embodiments, the matrix material comprises a polyamide polymer, a polyimide polymer, or a copolymer comprising polyamide or polyimide segments. In some embodiments, the matrix material comprises a polyamide-polyimide copolymer. Various application techniques for creation or application of the surface layer can be utilized by the skilled person. For example, a surface layer can be applied as a polymer coating by spray application of a liquid or powder coating composition comprising a polymer matrix material and dispersed solid lubricant 2D nanoparticles followed by curing to coalesce and solidify the coating. In some embodiments, the solid lubricant 2D nanoparticles are present in the surface layer at a concentration in a range with a low end of 35 wt. %, 45 wt. %, or 58 wt. %, and a high end of 72 wt. %, 68 wt. %, or 62 wt. %, based on the total coating solids. All possible combinations of the above-mentioned range endpoints (excluding impossible combinations where a low endpoint would have a greater value than a high endpoint) are explicitly included herein as disclosed ranges. The surface layer can also include various other materials. For example, in the case of polymer coatings, the surface layer can include various polymer coating additives (e.g., curing agents, antioxidants, coating aids, fillers, etc.).

Various materials can be utilized as solid lubricant 2D nanoparticles. As used herein, the term "2D" includes particles with a smallest dimension, or thickness, of 1 to 20 molecular layers, and one or more anisotropic dimensions along lines or planes that diverge from the thickness. In some embodiments, the anisotropic dimensions can extend beyond 100 nm, although this is not necessary. In some embodiments, the 2D nanoparticles can have an aspect ratio, defined as the ratio of the largest dimension to the smallest dimension of at least 10. In some embodiments, the 2D nanoparticles can have an aspect ratio, defined as the ratio of the largest dimension to the smallest dimension of at least 100. In some embodiments, the 2D nanoparticles can have an even higher aspect ratio of at least 2500. Higher levels of aspect ratios can be obtained at relatively complete levels of exfoliation, including to the level of a single molecular layer. As mentioned above, the 2D nanoparticles can have a thickness ranging from 1 to 20 molecular layers. In some embodiments, the 2D nanoparticles can have a thickness ranging from 1 to 15 molecular layers. In some embodiments, the 2D nanoparticles can have a thickness ranging from 1 to 10 molecular layers. In some embodiments, the 2D nanoparticles can have a thickness ranging from 1 to 5 molecular layers. In some embodiments, the 2D nanoparticles can have a thickness ranging from 1 to 4 molecular layers. In some embodiments, the 2D nanoparticles can have a thickness ranging from 1 to 3 molecular layers. In some embodiments, the 2D nanoparticles can have a thickness ranging from 1 to 2 molecular layers. In some embodiments, the 2D nanoparticles can have a thickness of 1 molecular layer. In some embodiments, the 2D nanoparticles can have a have a mean diameter in a range with a low end of 10 nm, 90 nm, or 1 µm, and a high end of 13 µm, 7 µm, or 5 µm. Mean diameter for 2D nanoparticles can be determined using commercially available electron microscopy measurement tools. All possible combinations of the above-mentioned range endpoints (excluding impossible combinations where a low endpoint would have a greater value than a high endpoint) are explicitly included herein as disclosed ranges. As the term "lubricant" is used herein with respect to the solid 2D nanoparticles, the solid 2D nanoparticles are considered as "lubricant" nanoparticles if the coating has a coefficient of friction that is less than a coefficient of friction of a comparison coating of the same matrix material but without the solid 2D nanoparticles. Examples of materials for the solid lubricant 2D nanoparticles include graphene, hexagonal boron nitride, or molybdenum disulfide. In some embodiments, the surface layer can include lubricant materials in addition to the solid lubricant 2D nanoparticles. Examples of such additional solid lubricant particles or nanoparticles include particles or nanoparticles of materials such as graphene, hexagonal boron nitride, or hexagonal molybdenum disulfide of different particle sizes than the solid lubricant 2D nanoparticles.

Solid 2D nanoparticles can be prepared by various techniques. Graphene, for example, can be prepared by different techniques including chemical vapor deposition onto a substrate up to a target thickness followed by removal of graphene from the substrate. Solid 2D nanoparticles, including graphene, hexagonal boron nitride, and hexagonal molybdenum disulfide, can also be prepared by exfoliation of a parent molecular three-dimensional material such as graphite, unexfoliated hexagonal boron nitride, or unexfoliated hexaganol molybdenum disulfide. Various exfoliation techniques can be used, including mechanical exfoliation, sonic exfoliation, thermal exfoliation, or chemical exfoliation. Many exfoliation techniques can be controlled (e.g., by controlling duration, reaction conditions such as agitation speed or temperature, or materials, or both duration and reaction conditions or materials) to produce solid 2D nanoparticles with particle size and configuration in a target range.

Figure 2:
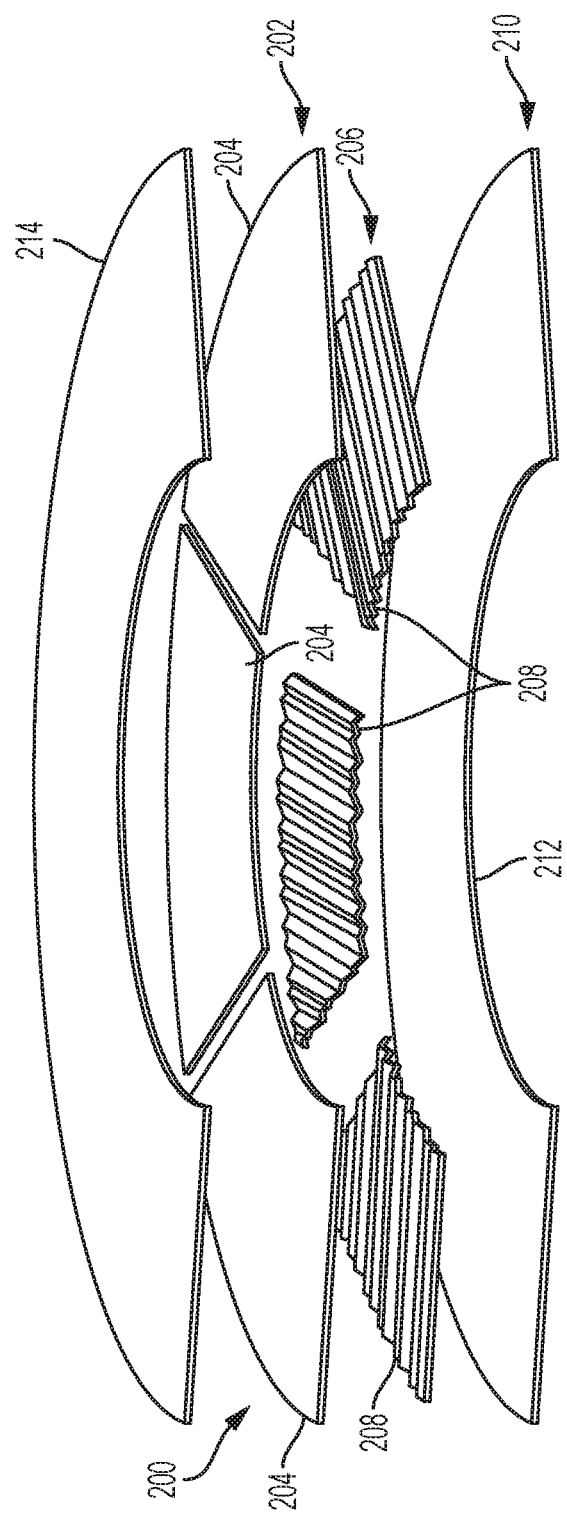
FIG. 2 is a partial exploded view of an example embodiment thrust bearing.

The bearing assembly shown in FIG. 1 is just one of many possible example embodiments. Another example embodiment is shown in FIG. 2, in which an exploded view is shown of an example embodiment of a hydrodynamic fluid film thrust bearing assembly ("thrust bearing 200"), which represents another type of foil hydrodynamic bearing. As is apparent from the Figures, the thrust bearing 200 of FIG. 2 has a different construction than the journal bearing 100 of FIG. 1. This is because journal bearings, such as shown in FIG. 1, operate with radial loads, whereas thrust bearings, as shown in FIG. 2, operate with axial loads. However, both types of bearings operate similarly by employing hydrodynamic fluid films, such as air or other fluids, to both provide bearing lubricant and cooling.

In the example embodiment of FIG. 2, the thrust bearing 200 includes three layers, but may include more or fewer layers. A first layer 202 comprises multiple arcuate top foils 204 that are spaced circumferentially relative to one another about a central axis. The top foils 204 are supported by a second layer 206 having a corresponding number of arcuate bump foils 208 arranged circumferentially beneath the top foils 204. The bump foils 208 are corrugated to provide cushioning and accommodate a cooling airflow through the thrust bearing 200. A third layer 210 is provided as an annular main plate 212 that supports the bump foils 208. The three layers 202, 206, and 210 can be secured to one another, for example, by spot welding. A rotating component 214, such as a thrust plate on an end of a rotating shaft can be positioned adjacent to the top foils 204. The rotating component 214 is typically in close proximity to the top foils 204, but for ease of illustration is shown in a partial exploded view with an exaggerated distance between the top foil 204 and the rotating component 214. During operation, moving air generated by action of the rotating component 214 urges pressurized air against the compliant foil structure to create a fluid air layer separating the rotating component 214 and the thrust bearing 200. As with the journal bearing 100 of FIG. 1, the surface layer (not shown) can be on the surface of the bearing surface on the radially inner surface of top foil 204, or the surface layer can be on the radially outer surface of the rotating component 214, or the surface layer can be on the surface of the bearing surface on the radially inner surface of top foil 204 and on the radially outer surface of the rotating component 214.

Figure 3:
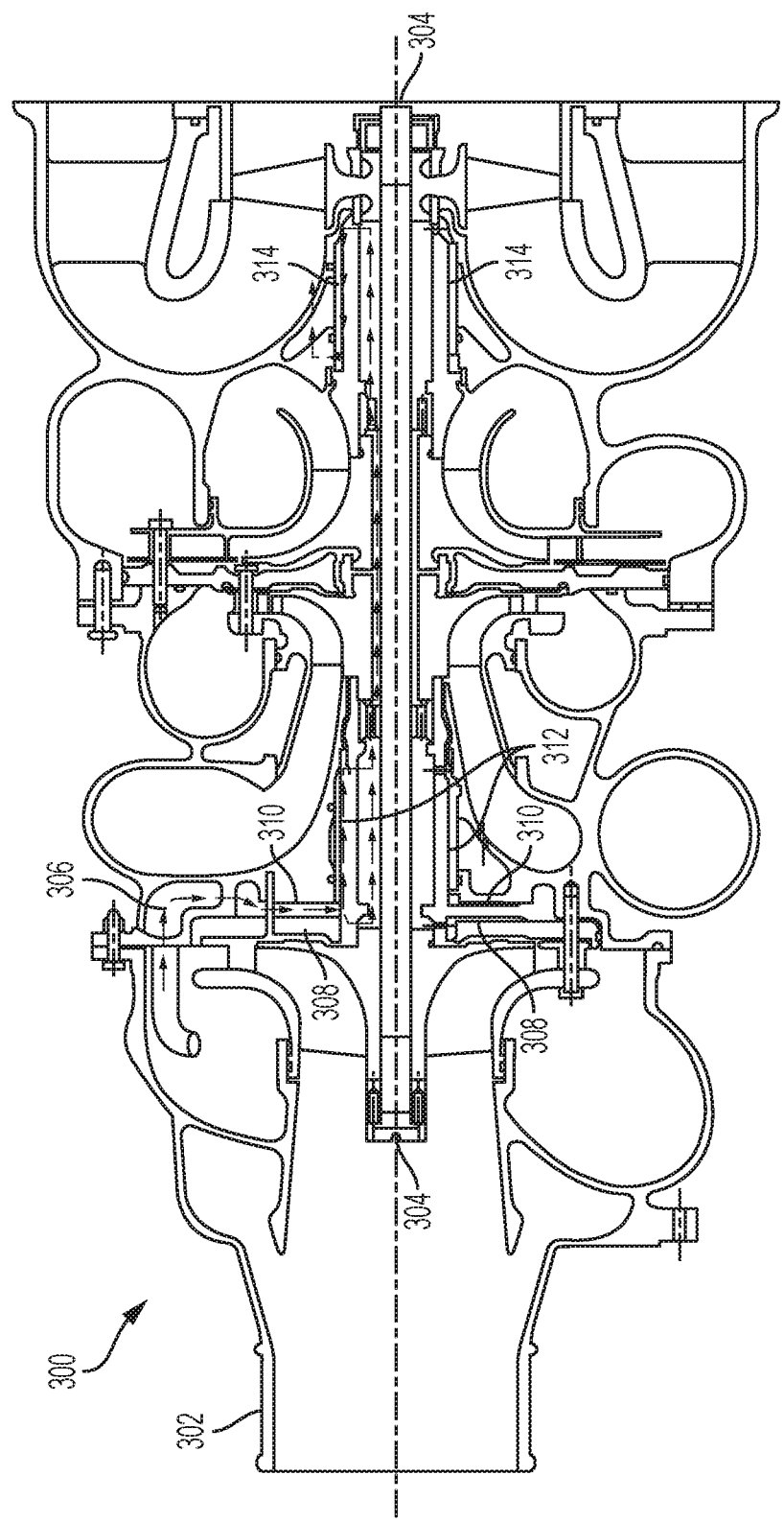
FIG. 3 is a schematic cross-sectional view of an air cycle machine.

In some embodiments, the above described hydrodynamic bearings can be employed in an air cycle machine such as those employed on aircraft. The hydrodynamic bearings provide a long lasting bearing with minimal to no required maintenance. This is because the bearings employ air as both a lubricating fluid and as a cooling fluid, which means that separate lubricating or cooling liquids are not typically required. An example embodiment of an air cycle machine is shown in FIG. 3. As shown in FIG. 3, an air cycle machine 300 is part of an environmental control system that is configured to supply conditioned air, for example, to a cabin of an aircraft. The air cycle machine 300 is a four-wheel air cycle machine, with four rotors on a single shaft 304. The four rotors are fixed together and are supported by bearing elements. There are, thus, four bearings configured within the air cycle machine 300 which are arranged along an airflow passage 306, which is represented by the path of arrows in FIG. 3. The air flow passage 306 provides air as both a lubricating fluid for the hydrodynamic bearings and as a cooling air flow to remove heat generated by the bearings during operation.

In the example configuration of FIG. 3, two of the four bearings are thrust bearings and two are journal bearings, as described above. The thrust bearings are located at the inlet side of the airflow passage 306, with the journal bearings located further downstream in the airflow passage 306. A first thrust bearing 308 is configured as an outboard thrust bearing and a second thrust bearing 310 is configured as an inboard thrust bearing. After the thrust bearings 308 and 310, in the direction of the airflow passage 306, a first journal bearing 312 is configured as a turbine journal bearing and then, toward the outlet of the airflow passage 306, a second journal bearing 314 is configured as a fan journal bearing. The thrust bearings 308 and 310 are configured to operate with axial loads, and the journal bearings 312 and 314 are configured to operate with radial loads within the engine 302. As a non-limiting example, the air cycle machine 300 may operate at 20,000-50,000 RPM. However, other rotational speeds of operation may be used.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A bearing assembly comprising:
a first component comprising a first bearing surface;
a second component comprising a second bearing surface;
a fluid disposed between the first bearing surface and the second bearing surface supporting the first bearing surface and the second bearing surface in a noncontact rotational relationship,
wherein the first bearing surface, the second bearing surface, or both the first bearing surface and the second bearing surface include a surface layer comprising solid lubricant nanoparticles in a matrix, said nanoparticles having 1 to 20 atoms along a first dimension and being present in the surface layer in a concentration of 35 wt. % to 72 wt. % based on total weight of the surface layer.

2. The bearing assembly of claim 1, wherein the solid lubricant nanoparticles include a second dimension of 10 nm to 25 μm perpendicular to the first dimension.

3. The bearing assembly of claim 1, wherein the solid lubricant nanoparticles comprise graphene, hexagonal boron nitride, molybdenum disulfide or combinations thereof.

4. The bearing assembly of claim 3, wherein the solid lubricant nanoparticles comprise graphene.

5. The bearing assembly of claim 3, wherein the solid lubricant nanoparticles comprise hexagonal boron nitride.

6. The bearing assembly of claim 3, wherein the solid lubricant nanoparticles comprise molybdenum disulfide.

7. The bearing assembly of claim 1, wherein the surface layer further comprises solid lubricant particles or nanoparticles different than the solid lubricant nanoparticles.

8. The bearing assembly of claim 7, wherein the solid lubricant particles or nanoparticles comprise graphene, hexagonal boron nitride, molybdenum disulfide or combinations thereof.

9. The bearing assembly of claim 1, wherein the second component comprises a compliant second bearing surface.

10. The bearing assembly of claim 9, wherein the compliant second bearing surface is in contact with the first bearing surface if the first and second components are stationary with respect to one another, and is displaced by the fluid out of contact with the first bearing surface at operational speeds.

11. The bearing assembly of claim 10, wherein the compliant second bearing surface comprises a top foil in contact with the first bearing surface at rest, and a bump foil disposed between the second component and the top foil.

12. The bearing assembly of claim 1, wherein the matrix comprises a polyimide or polyamide polymer or copolymer.

13. The bearing assembly of claim 1, wherein the first component is configured as a rotor and the second component is configured as a stationary support.

14. The bearing assembly of claim 13, wherein the rotor comprises a shaft comprising a radially outward-facing journal bearing surface as the first bearing surface.

15. The bearing assembly of claim 13, wherein the rotor comprises a shaft comprising an axially-facing thrust bearing surface as the first bearing surface.

16. The bearing assembly of claim 13, wherein the rotor and the support are components of an air cycle machine.

* * * * *